US011176609B2

(12) United States Patent
Lim et al.

(10) Patent No.: US 11,176,609 B2
(45) Date of Patent: Nov. 16, 2021

(54) SMART DEVICE AND TRACKING SYSTEM

(71) Applicants: Ascent Solutions Pte Ltd, Singapore (SG); 1Citadel Pte. Ltd., Singapore (SG)

(72) Inventors: Chee Kean Lim, Singapore (SG); Kia Boon Chew, Singapore (SG); Yihang Huang, Singapore (SG); Heng Wee Chin, Singapore (SG); Hian Leong Ong, Singapore (SG); Eng Guan Ng, Singapore (SG)

(73) Assignees: Ascent Solutions Pte Ltd, Singapore (SG); 1Citadel Pte. Ltd., Singapore (SG)

( * ) Notice: Subject to any disclaimer, the term of this patent is extended or adjusted under 35 U.S.C. 154(b) by 0 days.

(21) Appl. No.: 16/497,722

(22) PCT Filed: Dec. 12, 2017

(86) PCT No.: PCT/SG2017/050614
§ 371 (c)(1),
(2) Date: Sep. 25, 2019

(87) PCT Pub. No.: WO2019/117801
PCT Pub. Date: Jun. 20, 2019

(65) Prior Publication Data
US 2020/0034928 A1 Jan. 30, 2020

(51) Int. Cl.
*G06Q 40/04* (2012.01)
*H04W 4/029* (2018.01)

(52) U.S. Cl.
CPC ............ *G06Q 40/04* (2013.01); *H04W 4/029* (2018.02)

(58) Field of Classification Search
CPC ... G06Q 40/04; G06Q 10/0833; H04W 4/029; G01S 5/0205; G01S 5/0027; G01S 19/14
See application file for complete search history.

(56) References Cited

U.S. PATENT DOCUMENTS

| 9,062,476 | B2* | 6/2015 | Kao | E05B 73/0082 |
| 9,940,491 | B2* | 4/2018 | Lim | G07C 9/00 |
| 10,208,505 | B2* | 2/2019 | Lim | E05B 45/005 |
| 10,480,216 | B2* | 11/2019 | Lim | G06K 7/10297 |
| 10,554,649 | B1* | 2/2020 | Fields | H04L 9/3263 |
| 2010/0283575 | A1 | 11/2010 | Tubb et al. | |

(Continued)

FOREIGN PATENT DOCUMENTS

| WO | 2017082823 A1 | 5/2017 | |
| WO | WO-2017090041 A1 * | 6/2017 | ......... H04L 63/0428 |
| WO | 2019117801 A1 | 6/2019 | |

OTHER PUBLICATIONS

OMRON Corporation: RFID Systems, OMRON Industrial Automation, 2007-2020, pp. 1-5 (Year: 2007).*

(Continued)

*Primary Examiner* — Bijendra K Shrestha

(57) ABSTRACT

A smart device comprising: a blockchain application module to blockchain data obtained by the smart device, the smart device configured to transmit blockchained data to a blockchain data system. A smart tracking system comprising the smart device and a blockchain data system comprising a number of blockchain nodes each configured to receive and store a copy of the blockchained data transmitted from the smart device.

6 Claims, 2 Drawing Sheets

(56) References Cited

U.S. PATENT DOCUMENTS

| | | | |
|---|---|---|---|
| 2015/0154839 A1* | 6/2015 | Stoddard | G08B 13/1445 340/568.2 |
| 2017/0053249 A1* | 2/2017 | Tunnell | G06Q 20/065 |
| 2017/0206522 A1* | 7/2017 | Schiatti | G06Q 50/06 |
| 2017/0230189 A1* | 8/2017 | Toll | H04L 9/3247 |
| 2017/0232300 A1* | 8/2017 | Tran | G16H 20/30 434/247 |
| 2017/0262668 A1* | 9/2017 | Lim | G06K 7/10297 |
| 2017/0262862 A1 | 9/2017 | Aljawhari | |

OTHER PUBLICATIONS

Camerinelli, Enrico: Blockchain in the Supply Chain, May 13, 2016, pp. 1-5 (Year: 2016).*

Dickson, Ben: How blockchain can change the future of IoT: Nov. 20, 2016, VentureBeat, pp. 1-7 (Year: 2016).*

Chen et al.: Design of intelligent lock based on triple Keeploq algorithm, 2016, Advances in Mechanical Engineering, vol. 8(4), pp. 1-7 (Year: 2016).*

Foreign Communication from a Related Counterpart Application,Extended European Search Report dated Dec. 10, 2019, International Application No. PCT/SG2017050614 filed on Dec. 12, 2017.

Foreign Communication from a Related Counterpart Application, International Search Report and Written Opinion dated Feb. 28, 2018, International Application No. PCT/SG2017/050614 filed on Dec. 12, 2017.

* cited by examiner

SMART DEVICE AND TRACKING SYSTEM

CROSS-REFERENCE TO RELATED APPLICATIONS

The present application is a filing under 35 U.S.C. 371 as the National Stage of International Application No. PCT/SG2017/050614, filed Dec. 12, 2017, entitled "SMART DEVICE AND TRACKING SYSTEM," which is incorporated herein by reference in its entirety for all purposes.

FIELD OF THE INVENTION

This invention relates to a smart device and tracking system, and in particular to a smart device and tracking system for logistics management and trade financing.

BACKGROUND OF THE INVENTION

Currently, securing and location tracking of items such as cargo, persons and assets may be achieved by affixing a smart device with an active beaconing tag to the item to be tracked, and deploying proprietary readers at key locations to read signals emitted by the active tag. The proprietary readers then transmit the signals to a data system. Smart devices also exist that communicate with the data system via Bluetooth low energy wireless personal area network, NB-IoT network, and GSM network. While such security and location tracking systems may be successfully deployed to secure and track the transportation of cargo and other assets by preventing physical tampering of the items being transported, it is however still possible to electronically tamper with the communication between the smart device and the data system and to alter information stored within the data system. There is therefore a need to provide a smart security and location tracking system that not only physically secures and tracks the location items being transported, but also provides security in the communication between the smart device and the data system, and within the data system itself, for safe and efficient logistics management and trade financing.

SUMMARY OF INVENTION

According to a first aspect, there is provided a smart device comprising: a blockchain application module to blockchain data obtained by the smart device, the smart device configured to transmit blockchained data to a blockchain data system.

The smart device may be configured to transmit blockchained data to the blockchain data system via at least one of: the Internet, a cellular network, a Bluetooth Low Energy wireless network, satellite.

The smart device may further comprise a tag uniquely associated with the smart device and configured to automatically and periodically emit a signal, the signal being a Bluetooth Low Energy signal configured to be sent and received via the Bluetooth Low Energy network.

The smart device may further comprise a Global Navigation Satellite System (GNSS) module for location tracking of the smart device via GNSS.

The smart device may further comprise a physical lock to releasably secure the smart device to an item, the physical lock in electronic communication with the smart device.

At least a portion of the data obtained by the smart device may be provided to the smart device from at least one sensor in communication with the smart device.

The blockchain module may be provided in one of: a microcontroller chip of the smart device, a memory chip of the smart device, and a separate microprocessor chip in the smart device.

According to a second aspect, there is provided a smart tracking system comprising: the smart device of the first aspect; and a blockchain data system comprising a number of blockchain nodes each configured to receive and store a copy of the blockchained data transmitted from the smart device.

The smart tracking system may further comprise at least one sensor in communication with the smart device to provide at least a portion of the data obtained by the smart device.

At least some of the number of blockchain nodes may each be maintained by a distinct one of a number of transacting parties in a commercial matter using the smart tracking system.

The blockchained data in the blockchain data system may be made accessible to only authorized parties.

According to a third aspect, there is provided a trade financing platform comprising the smart tracking system of the second aspect, wherein the smart device is attached to goods involved in a transaction handled using the trade financing platform, and wherein the smart device is configured to automatically determine at least one of: location and security of the goods, and to periodically blockchain data of the goods and transmit the blockchained data to the blockchain data system.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Exemplary embodiments of a smart device 10 and smart tracking system 100 will be described below with reference to FIGS. 1 and 2.

Figure 1:
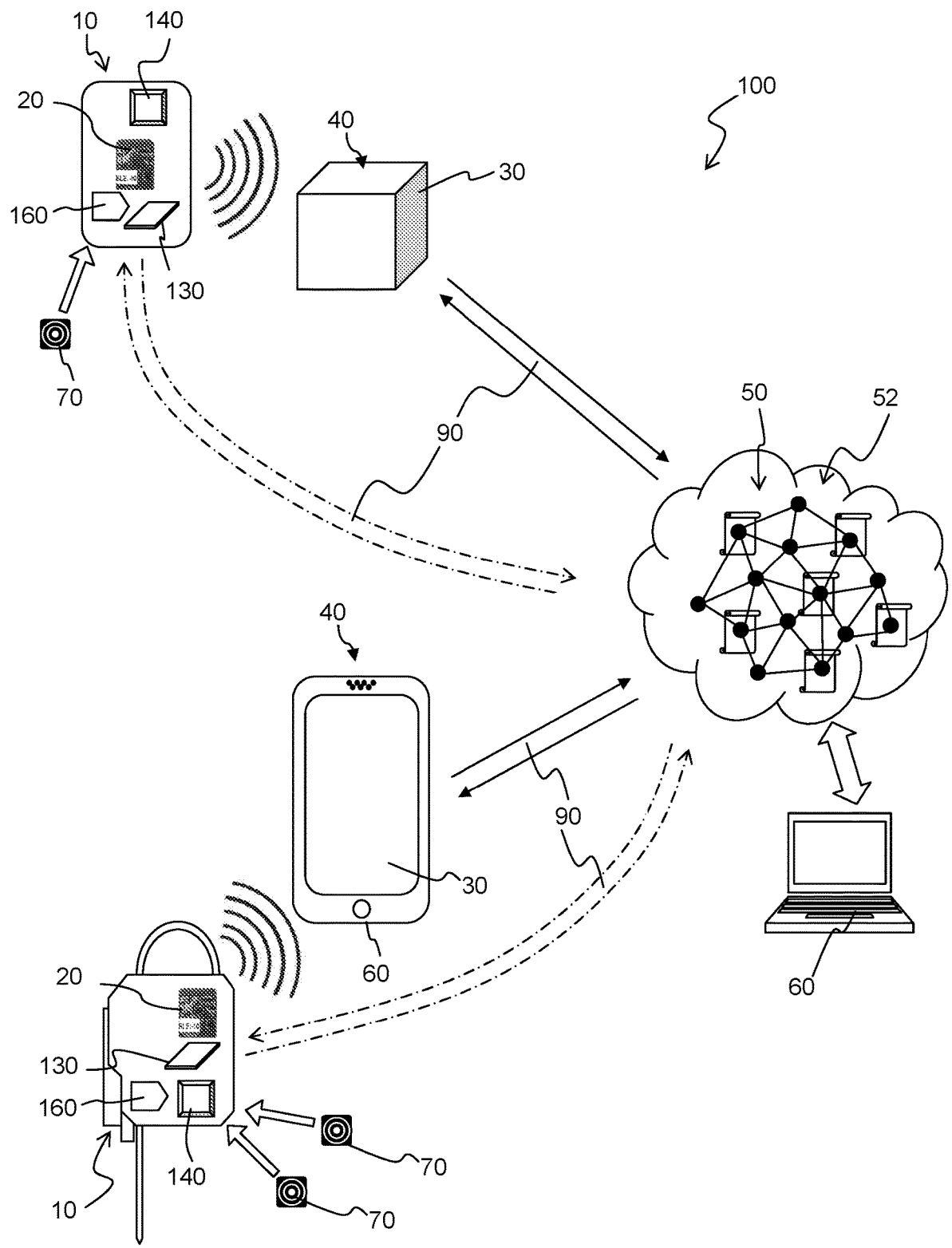
FIG. 1 is a schematic illustration of an exemplary smart device and tracking system.

As shown in FIG. 1, in general, the smart tracking system 100 (hereinafter referred to as "system 100" for short) comprises a blockchain data system 50 and at least one smart device 10 configured to communicate with the blockchain data system 50. The smart device 10 may communicate with the blockchain data system 50 via communications means 90 such as the Internet, a cellular network such as GPRS, 3G, 4G or NB-IoT, a Bluetooth Low Energy wireless network, or satellite.

The smart device 10 may be provided with a physical lock to releasably secure the smart device 10 to an item (not shown). The physical lock is preferably in electronic communication with the smart device 10 that is preferably also configured to detect and record whether the smart device 10 is in a physically locked or unlocked state.

Optionally, the smart device 10 may include a low-cost active RFID beaconing tag 20. The tag 20 is configured to automatically continually and periodically emit a Bluetooth Low Energy (BLE) signal, i.e., a signal in the Industrial, Scientific and Medical (ISM) 2.4 GHz short-range radio frequency band that is sent and received via a Bluetooth low energy wireless personal area network (BLE). The tag 20 has a long battery life, for example up to five years, without requiring recharge or battery change. The tag 20 is preferably powered by a small lithium-ion battery. Information transmitted with the emitted signal comprises a unique identification number of the smart device 10, and may further comprise any other electronically stored information as may be desired, such as date and time of each activation and deactivation of the smart device 10. The tag 20 typically has a broadcast range for its emitted signals comprising a radius ranging of up to 50 m. In the preferred embodiment, the tag 20 is sufficiently low in cost, as to be commercially feasible for only one-time or disposable use. The tag 20 is preferably provided in the housing 20 in the first exemplary embodiment of the smart device 10.

The Bluetooth Low Energy signals emitted by the tag 20 are configured to be received by receiving transmitters 40 optionally provided in the system 100 together with the optional tag 20 provided in the smart device 10. Each receiving transmitter 40 is configured to communicate with the blockchain data system 50 via communications means 90 such as the Internet, a cellular network such as GPRS, 3G, 4G or NB-IoT, a Bluetooth Low Energy wireless network, or satellite. Each receiving transmitter 40 may take one of various forms including but not limited to a stationary device, a smartphone, a tablet, a handheld device, a wearable computing device, a wireless handset, a pager, a personal digital assistant (PDA), a gaming device, a media player, a headset computer, a wireless router or the like. Each receiving transmitter 40 may include a display and a touch-sensitive surface and/or keys for input by a user. Where the receiving transmitter 40 comprises a smart touch-screen mobile phone, it will be understood that the display and touch-sensitive surface are one and the same.

The receiving transmitter 40 may present options for the user to select controls for the user to actuate, and/or cursors or other indicators for the user to direct. The receiving transmitter 40 may further accept data entry from the user, including numbers to dial or various parameter values for configuring the operations of the smart device 10. The receiving transmitter 40 may further execute one or more software or firmware applications in response to user commands. These applications may configure the receiving transmitter 40 to perform various customized functions in response to user interaction. Additionally, the receiving transmitter 40 may be programmed and/or configured over-the-air, for example from a wireless base station, a wireless access point, or a peer receiving transmitter 40. The receiving transmitter 40 may execute a web browser application which enables the display of the receiving transmitter 40 to show a web page. The web page may be obtained via wireless communications with a base transceiver station, a wireless network access node, a peer receiving transmitter 40 or any other wireless communication network or system.

A software application 30 installed in each receiving transmitter 40 is configured for managing information obtained from a signal received from a tag 20. For example, the application 30 may be configured to associate the unique identification number of the smart device 10 in a signal received from the tag 20 with the receiving transmitter's 40 own present location and identity. The application 30 may be configured to be downloadable from a digital distribution platform (e.g. App Store™ or Google Play™) for installation in each receiving transmitter 40 via Internet connectivity of the receiving transmitter 40.

Notably, each receiving transmitter 40 is configured to automatically receive signals emitted by any number of tags 20 provided in a corresponding number of smart devices 10 when the receiving transmitter 40 is within the broadcast range of any of the smart devices 10. In particular, no pairing between a receiving transmitter 40 and an emitting tag 20 is required in order for the receiving transmitter 40 to receive the signals emitted by the tag 20. The receiving transmitter 40 may further include an antenna and front end unit, a baseband processing unit, a microphone, an earpiece and/or speaker, a headset port, an input/output interface, a removable memory card, a universal serial bus (USB) port, an infrared port, a vibrator, a keypad, a touch screen with a touch sensitive surface, a touch screen controller, a camera, a camera controller, a global positioning system (GPS) module, an accelerometer (e.g., a single or multi axis accelerometer), a gyroscope, and the like.

Optionally, the smart device 10 may further include a Global Navigation Satellite System (GNSS) module 140 configured to determine its location via a Global Navigation Satellite System, receive GNSS signals via a Global Navigation Satellite System and calculate coordinates, and also transmit its present location coordinates to the blockchain data system 50, as shown in FIG. 1. In this way, the system 100 can use GNSS as an alternative to the tags 20 and receiving transmitters 40 in order for the blockchain data system 50 to directly track location of the smart device 10.

As the system 100 can be configured to perform one or both automatic as well as user-activated transmission of information from one or more receiving transmitters 40 to the blockchain data system 50 when the one or more receiving transmitters 40 are within the broadcast range of any number of tags 20 in a corresponding number of smart devices 10, and by optionally providing GNSS capability in the system 100 together with communication networking functionality of the smart device 20 and BLE functionality, the system 100 can appreciably be variously and appropriately configured to suit multiple different fields of use in the security industry while ensuring that loss of location tracking is minimized, for example when no receiving transmitter 40 having GNSS functionality is within broadcast range of the tag 20 in order to transmit location information of the tag 20.

In addition to the smart device 10 being able to communicate with the blockchain data system 50 and to provide location information of the smart device 10, the smart device 10 is preferably also configured to obtain and store data that can be provided to the blockchain data system 50. The data obtained by the smart device 10 may include anything related to the status of an item or its environment to which the smart device 10 is attached (for example when the smart device 10 comprises a security device for securing and location tracking of the item) and/or related to the smart device 10 itself. For example, the item may be a cargo container, an intermediate bulk container, a carton, a package, and so on, that is to be safely transported from one location to another, tracked during shipment, and eventually confirmed as delivered to the correct recipient. Data that is obtained and stored by the smart device 10 is preferably time-stamped.

Data obtained and stored by the smart device 10 may comprise information such as location of the smart device 10 (this being therefore equivalent to location of an item to which the smart device 10 is attached), a physical locked/unlocked state and/or tamper status of the smart device 10 (as obtained by known smart locking features that may be provided in the smart device 10 itself), other data such as temperature, humidity, freshness of the item or its environment (as obtained by one or more appropriate sensors 70 provided in communication with the smart device 10), an in-use or collapsed state of the item where the item is an intermediate bulk container (as obtained by one or more appropriately positioned accelerometers 70 in communication with the smart device 10), and so on. For simplicity of reference, one or more components such as temperature/humidity sensors, biosensors, other environmental sensors and accelerometers that are provided in the system 100 and in communication with the smart device 10 to obtain data about the item and/or its environment and/or the smart device 10 itself shall henceforth be referred to generally as "sensors 70" in the system 100. Accordingly, the smart device 10 is preferably provided with a memory module (not shown) to store the data obtained by the one or more sensors 70.

In order to protect the integrity of the data obtained by the smart device 10 from the sensors 70 and to facilitate secured transmission and distribution of the data to and within the blockchain data system 50, the blockchain data system 50 may be configured as a distributed ledger that receives and stores data that has been blockchained prior to being sent to the blockchain data system 50 from the smart device 10. Accordingly, the smart device 10 is provided with a blockchain application module 160 to blockchain the data obtained by the smart device 10 into a blockchain 200 of immutable blocks of data, via hash-linking and time-stamping to chain all blocks of data together, as will be described in greater detail below with reference to FIG. 2. The blockchain application module 160 may be provided as a module embedded in an existing chip of the smart device 10 (for example in a microcontroller chip or a memory chip), or alternatively provided in a separate microprocessor chip in the smart device 10.

Figure 2:
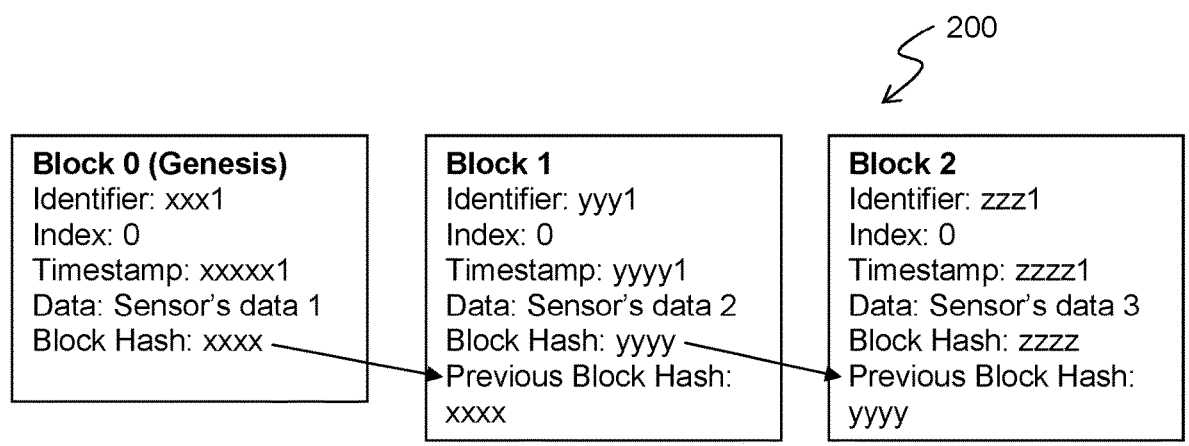
FIG. 2 is a schematic illustration of blockchaining data obtained by a smart device of the smart tracking system of FIG. 1.

As schematically illustrated in FIG. 2, the blockchain application module 160 in the smart device 10 blockchains data in the smart device 10 by first automatically generating a genesis block (Block 0) that uniquely identifies the specific smart device 10. Generating a genesis block comprises creating and initialising the genesis block, and is preferably performed when the smart device 10 is first activated, for example when the smart device 10 is prepared and activated by the manufacturer. Generating the genesis block (Block 0) includes generating a hash for Block 0 using a hash algorithm such as SHA-256. After Block 0 has been generated, a new piece of data that is next obtained by the smart device 10 from one or more sensors 70 provided in the system 100 is captured as a new block (Block 1) that is blockchained to Block 0 by embedding the hash of Block 0 into Block 1 and generating a hash for Block 1. Another new piece of data that is subsequently obtained by the smart device 10 from one or more sensors 70 provided in the system 100 is captured as another new block (Block 2) that is blockchained to Block 1 by embedding the hash of Block 1 into Block 2 and generating a hash for Block 2. In this way, all subsequent up to n pieces of data obtained by the smart device 10 from the sensors 70 are captured as sequential blocks that are blockchained onto the existing blockchain 200 (i.e., Block 0-Block 1-Block 2- . . . Block n) by embedding the hash of a preceding block into a current block and generating a hash for the current block that will in turn be embedded into a succeeding new block that will be generated and blockchained onto the existing blockchain 200 whenever a new piece of data is obtained by the smart device 10.

The blockchain data system 50 typically comprises a number of blockchain nodes 52 (represented by black dots in FIG. 1) that are each configured to receive and store an authorised copy of the latest update of the blockchain 200 unique to the smart device 10. Each node 52 is distinct and typically maintained by a distinct transacting or interested party involved in a commercial matter using the smart tracking system 100. For example, for a commercial matter in trade financing, the transacting or interested parties may include one or more of a financial institution, an insurer, a command centre, a logistics company and so on, each of whom may maintain a node 52 of the blockchain data system 50 according to how it may be desired to design the blockchain data system 50 for the particular commercial matter.

Preferably, every new piece of data that is to be blockchained and distributed to the blockchain data system 50 is first verified and authorised by a predetermined (preferably majority) number of nodes 52 in the blockchain data system 50. By blockchaining, data obtained by the smart device 10, it will be possible to detect whether any data purporting to conic from the smart device 10 has been falsified or tampered. This is because each piece of data that has been authentically obtained by the smart device 10 would have been cryptographically coupled to a previously obtained piece of data in the blockchain 200 unique to the smart device 10, and in order to tamper with any piece of data, every block in the blockchain 200 must be re-computed and replicated to a predetermined number of all the nodes (e.g. at least 50%) in the blockchain data system 50, which would be mathematically impossible, while any attempt to do so would be highly noticeable. Furthermore, should there be an unauthorized change in the blockchain 200 at one of the nodes, the other nodes will detect and reject the unauthorized change. In this way, security is ensured for the data obtained by the smart device 10 as all the obtained data is blockchained and therefore cannot be changed without authorization. This ensures that it will be extremely difficult for transacting parties to hack into the system 100, and any attempt to do so can be easily detected together with the identity of the node from which hacking had been attempted.

As the blockchain 200 is decentralized by duplicating it at each node in the blockchain data system 50, the system 100 thus provides transparency, trust, faster processing and less overhead for securely storing data obtained by the smart device 10. This is because the blockchain 200 also functions as a ledger of transactions, and replication of the blockchain 200 to each of the nodes in the blockchain data system 50 ensures that no single entity has full control over the data obtained by the smart device 10, while allowing multiple parties to inspect the transactions.

Accordingly, the blockchain data system 50 is preferably configured to allow only parties having proper permissions or authorizations to use any client machine 60 to access data in the blockchain data system 50, for example to perform functions such as inspecting transactions and querying a status of an item that has been secured with the smart device 10. This allows a last known location of the item and other relevant information to be obtained from the blockchain data system 50 and displayed on the client machine 60. The blockchain data system 50 may be configured to allow authorized users to view on the client machines 60 a movement history of the item as previously registered by the blockchain data system 50. Notably, any one of the receiving transmitters 40 may be additionally configured to function as a client machine 60.

When used in commercial matters of trade financing, a key feature of the smart tracking system 100 serving as a trade financing platform is to be able to bring quality and genuine data points from a physical supply chain to platform users. The data points provided from the supply chain as stored and distributed in the blockchain data system 50 using the smart device 10 will allow platform users to reduce financing risks (e.g. fraud, credit, operational risks) by ensuring that the physical supply chain matches the documentation data and financial data in the trade flows. Data of goods during shipment (for example location data, security data, and other data such as environmental data, temperature, humidity, biosensor data and so on) can be automatically determined using one or more sensors 70 provided in the system 100 and one or more smart devices 10 attached to the goods, and such data automatically periodically blockchained and transmitted to the data system 50; the arrival of the goods at predetermined waypoints during shipment can constitute data obtained by the one or more smart devices 10 and likewise automatically blockchained and transmitted to the blockchain data system 50 from the one or more smart devices 10. Thus, using the smart tracking system 100 in a trade financing platform, movement of goods is made not only more secure but also transparent, while falsification of data is minimized or entirely prevented. Through the accumulation of historical data in the blockchain data system 50, investors will also be able to better assess and predict risk, and thus be able to price risk more accurately.

Whilst there has been described in the foregoing description exemplary embodiments of the present invention, it will be understood by those skilled in the technology concerned that many variations in details of design, construction and/or operation may be made without departing from the present invention. For example, while the Internet, GPRS, a cellular network (e.g. 3G, 4G, NB-IoT) or satellite have been mentioned as examples of the communication network between the smart device and the data system, other examples of wireless communication such as LTE-M, 5G, LoRa®, Sigfox®, 2.5 GHz wireless, 5 GHz wireless, TV White Space and so on may also be used. While an embodiment of the smart device has been described above as a security device for securing and location tracking of an item, the smart device may also comprise a mobile device such as a smartphone, a tablet, a laptop and so on.

The invention claimed is:

1. A trade financing platform comprising:
   at least one sensor in communication with a smart device to provide data to the smart device;
   a physical lock to releasably secure the smart device to goods involved in a transaction handled using the trade financing platform, wherein the physical lock is in electronic communication with the smart device and configured to detect and record at least one of a physical locked/unlocked state or a tamper status of the smart device;
   the smart device attached to the goods and comprising at least one of a microcontroller chip or a separate microprocessor chip and comprising at least one of a memory chip or a memory of the microcontroller chip, the smart device configured to:
   automatically determine location and security of the goods,
   receive the data from the at least one sensor,
   receive the physical locked/unlocked state or the tamper status of the smart device from the physical lock,
   store the location and security of the goods, the data from the at least one sensor, and
   the physical locked/unlocked state or the tamper status of the smart device in at least one of the memory chip or the memory of the microcontroller chip,
   wherein the smart device further comprises a blockchain application module provided in the microcontroller chip of the smart device, the memory chip of the smart device, or the separate microprocessor chip in the smart device that when executed by the microcontroller chip or the separate microprocessor chip:
   automatically blockchains the data from the at least one sensor, the location and security of the goods, and the physical locked/unlocked state or the tamper status into a blockchain without human intervention, and
   transmits via a network the blockchain comprising the blockchained data to a blockchain data system; and
   the blockchain data system comprising a number of blockchain nodes each configured to receive via the network the blockchained data transmitted from the smart device, verify each piece of data in the blockchained data received from the smart device, and store a copy of the blockchained data received from the smart device,
   wherein transmission of the blockchained data from the smart device to the blockchain data system provides security and detection of whether any data purporting to come from the smart device has been falsified or tampered,
   wherein at least one party having proper permissions or authorizations uses a client machine to access and view data in the blockchain data system including one or more of a status of the goods, a last known location of the goods, or a movement history of the goods as previously registered by the blockchain data system, and
   wherein secured arrival of the goods at predetermined waypoints is confirmed by the smart device by automatically blockchaining and transmitting to the blockchain system.

2. The trade financing platform of claim 1, wherein the smart device is configured to be attached to an item containing the goods, and wherein the item comprises a cargo container, an intermediate bulk container, a carton, or a package.

3. The trade financing platform of claim 1, wherein the at least one sensor comprises a temperature sensor and a humidity sensor, wherein the smart device is configured to receive temperature data and humidity data from the temperature sensor and the humidity sensor, and wherein the data obtained by the smart device and automatically blockchained by the blockchain application module into the blockchain comprises the temperature data and the humidity data.

4. The trade financing platform of claim 1, wherein the smart device is configured to transmit blockchained data to the blockchain data system via at least one of: the Internet, a cellular network, a Bluetooth Low Energy wireless network, and satellite.

5. The trade financing platform of claim 1, wherein the smart device further comprises a Global Navigation Satellite System (GNSS) application that tracks a location of the smart device via GNSS.

6. The trade financing platform of claim 1, wherein at least some of the number of blockchain nodes are each maintained by a distinct one of a number of transacting parties in a commercial matter using the trade financing platform.

* * * * *